US012353611B2

(12) United States Patent
Iaremenko et al.

(10) Patent No.: US 12,353,611 B2
(45) Date of Patent: Jul. 8, 2025

(54) HARDWARE USER INTERFACE FIREWALL

(71) Applicant: Hub data security Ltd., Tel Aviv (IL)

(72) Inventors: Andrey Iaremenko, Bat Yam (IL); Eyal Moshe, Tel aviv (IL); Ofir Avraham Swisa, Givatayim (IL)

(73) Assignee: HUB DATA SECURITY LTD., Tel Aviv (IL)

( * ) Notice: Subject to any disclaimer, the term of this patent is extended or adjusted under 35 U.S.C. 154(b) by 236 days.

(21) Appl. No.: 17/654,071

(22) Filed: Mar. 9, 2022

(65) Prior Publication Data

US 2022/0300667 A1     Sep. 22, 2022

Related U.S. Application Data

(60) Provisional application No. 63/158,360, filed on Mar. 9, 2021.

(51) Int. Cl.
*G06F 21/85* (2013.01)
*G06F 3/041* (2006.01)
*G06F 3/14* (2006.01)

(52) U.S. Cl.
CPC ............ *G06F 21/85* (2013.01); *G06F 3/0416* (2013.01); *G06F 3/14* (2013.01)

(58) Field of Classification Search
None
See application file for complete search history.

(56) References Cited

U.S. PATENT DOCUMENTS

| | | | | |
|---|---|---|---|---|
| 9,275,210 B2 * | 3/2016 | Adams | ........... | G06F 21/316 |
| 9,489,505 B2 * | 11/2016 | Heider | ........... | G06F 21/44 |
| 9,607,181 B2 * | 3/2017 | Matsumoto | ........... | G06F 21/86 |
| 9,811,254 B2 * | 11/2017 | Ninomiya | ........... | G07F 7/0893 |
| 2004/0150582 A1 * | 8/2004 | Dunn | ........... | G09G 3/20 |
| | | | | 345/1.3 |
| 2008/0209212 A1 * | 8/2008 | Ditzman | ........... | G06F 21/60 |
| | | | | 713/167 |
| 2009/0034804 A1 * | 2/2009 | Cho | ........... | G06F 21/608 |
| | | | | 382/116 |
| 2011/0025610 A1 * | 2/2011 | Whytock | ........... | G06F 21/83 |
| | | | | 345/173 |
| 2011/0025611 A1 * | 2/2011 | Yoo | ........... | A61B 3/032 |
| | | | | 345/173 |
| 2013/0219188 A1 * | 8/2013 | Lee | ........... | G06F 1/3203 |
| | | | | 713/189 |

(Continued)

*Primary Examiner* — Jason A Pringle-Parker
(74) *Attorney, Agent, or Firm* — Reches Patents

(57) ABSTRACT

A hardware controller for securing one or more parts of an MMI, the hardware controller may include a MMI interface configured to communicate with the MMI; a first security level (SL) processor interface configured to communicate with a first SL processor while maintaining the first SL; a second SL processor interface configured to communicate with a second SL processor while maintaining the second SL; wherein the second SL differs from the first SL; a configuration interface configured to receive configuration information that divides the MMI to one or first SL MMI areas and to one or more second SL MMI areas; and a controller core configured to control, based on the configuration information, (a) a communication between the first SL processor and the one or first SL MMI areas, and (b) a communication between the second SL processor and the one or second SL MMI areas.

14 Claims, 8 Drawing Sheets

(56) References Cited

U.S. PATENT DOCUMENTS

| | | | |
|---|---|---|---|
| 2014/0090041 A1* | 3/2014 | Kim | G06F 21/31 |
| | | | 726/7 |
| 2014/0181964 A1* | 6/2014 | Park | G06F 3/0486 |
| | | | 726/19 |
| 2015/0324615 A1* | 11/2015 | Matsumoto | G06Q 20/20 |
| | | | 726/34 |
| 2015/0324781 A1* | 11/2015 | Saitoh | G06Q 20/20 |
| | | | 705/17 |
| 2016/0042178 A1* | 2/2016 | Ninomiya | G06F 21/629 |
| | | | 726/23 |
| 2016/0042201 A1* | 2/2016 | Ninomiya | G06F 3/0416 |
| | | | 345/87 |
| 2017/0140364 A1* | 5/2017 | Saitoh | H04M 1/72403 |

* cited by examiner

HARDWARE USER INTERFACE FIREWALL

CROSS REFERENCE

This application claims priority from U.S. provisional patent Ser. No. 63/158,360 filing date 9 Mar. 2021, which is incorporated herein by reference by its entirety.

BACKGROUND

In today's connected mobile world, it is a hard to keep the private personal secret information separated from the internet and protected from the access by unauthorized outsiders. The user device (e.g. smartphone) needs to keep our passwords, private access keys, digital id secure and at the same time provide very rich intuitive easy interface to use these secrets in everyday life.

Current solutions are inadequate and compromise on usability or on the security. Smartphones include a dedicated hardened area inside the main chip, which is used to store private encryption and authentication keys and execute cryptographic algorithms. However, the main screen of the phone is connected through the nonsecure chip and OS and is a vulnerable to attack when displaying and manipulating the data from the secure area of the chip. The existing solutions use separate display and user interface or a full standalone hardware device. Both options greatly reduce the ease of use and attraction of the phone and substantially increase the cost.

SUMMARY

There may be provided a hardware controller for securing one or more parts of an MMI, the hardware controller may include a MMI interface configured to communicate with the MMI; a first security level (SL) processor interface configured to communicate with a first SL processor while maintaining the first SL; a second SL processor interface configured to communicate with a second SL processor while maintaining the second SL; wherein the second SL differs from the first SL; a configuration interface configured to receive configuration information that divides the MMI to one or first SL MMI areas and to one or more second SL MMI areas; and a controller core configured to control, based on the configuration information, (a) a communication between the first SL processor and the one or first SL MMI areas, and (b) a communication between the second SL processor and the one or second SL MMI areas.

There may be provided a method for securing one or more parts of a man machine interface (MMI), the method may include (i) receiving configuration information, by a configuration interface of the hardware controller, wherein the configuration information divides the MMI to one or first SL MMI areas and to one or more second SL MMI areas; (ii) communicating, by an MMI interface of a hardware controller, with the MMI; (iii) communicating, by a first SL processor interface of the hardware controller, with a first SL processor while maintaining the first SL; (iv) communicating, by a second SL processor interface of the hardware controller with a second SL processor while maintaining the second SL; wherein the second SL differs from the first SL; and (v) controlling, by a controller core of the hardware controller, based on the configuration information, (a) a communication between the first SL processor and the one or first SL MMI areas, and (b) a communication between the second SL processor and the one or second SL MMI areas.

There may be provided a non-transitory computer readable medium for securing one or more parts of a man machine interface (MMI), the non-transitory computer readable medium stores instructions for (i) receiving configuration information, by a configuration interface of the hardware controller, wherein the configuration information divides the MMI to one or first SL MMI areas and to one or more second SL MMI areas; (ii) communicating, by an MMI interface of a hardware controller, with the MMI; (iii) communicating, by a first SL processor interface of the hardware controller, with a first SL processor while maintaining the first SL; (iv) communicating, by a second SL processor interface of the hardware controller with a second SL processor while maintaining the second SL; wherein the second SL differs from the first SL; and (v) controlling, by a controller core of the hardware controller, based on the configuration information, (a) a communication between the first SL processor and the one or first SL MMI areas, and (b) a communication between the second SL processor and the one or second SL MMI areas.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system (or device) that is configured to execute the method and/or to a non-transitory computer readable medium that stores instructions that once executed by the system (or device) will cause the system to execute the method.

Any reference to a non-transitory computer readable medium should be applied, mutatis mutandis to a method that is executed by a system and/or a device that is configured to execute the instructions stored in the non-transitory computer readable medium.

Any reference to a "solution" should be applied mutatis mutandis, to a method, a system, a device, and a non-transitory computer readable medium as illustrated below.

The term "and/or" is additionally or alternatively.

The suggested hardware controller enables seamless separation of the main display between the secure hardware and nonsecure hardware of the device. The separation includes both the display and the touch interface and can be seamlessly controlled from the secure hardware art of the device.

A display" can be any type of display—such as a LCD display, an OLED display, a collection of light emitting diodes (LEDs) where each pixel is a large illumination device (like on the street signs), can be a collection of several illumination modules (like a numerical characters on the handheld calculator).

A pixel can be a miniature transistor and also a TV screen.

A touch screen can use any technology to sense touch—for example be capacitive/resistive/other advanced touch technology or a collection of buttons (like a keypad/keyboard). In other words, touch point can be of any size from miniature to large physical button.

Figure 1:
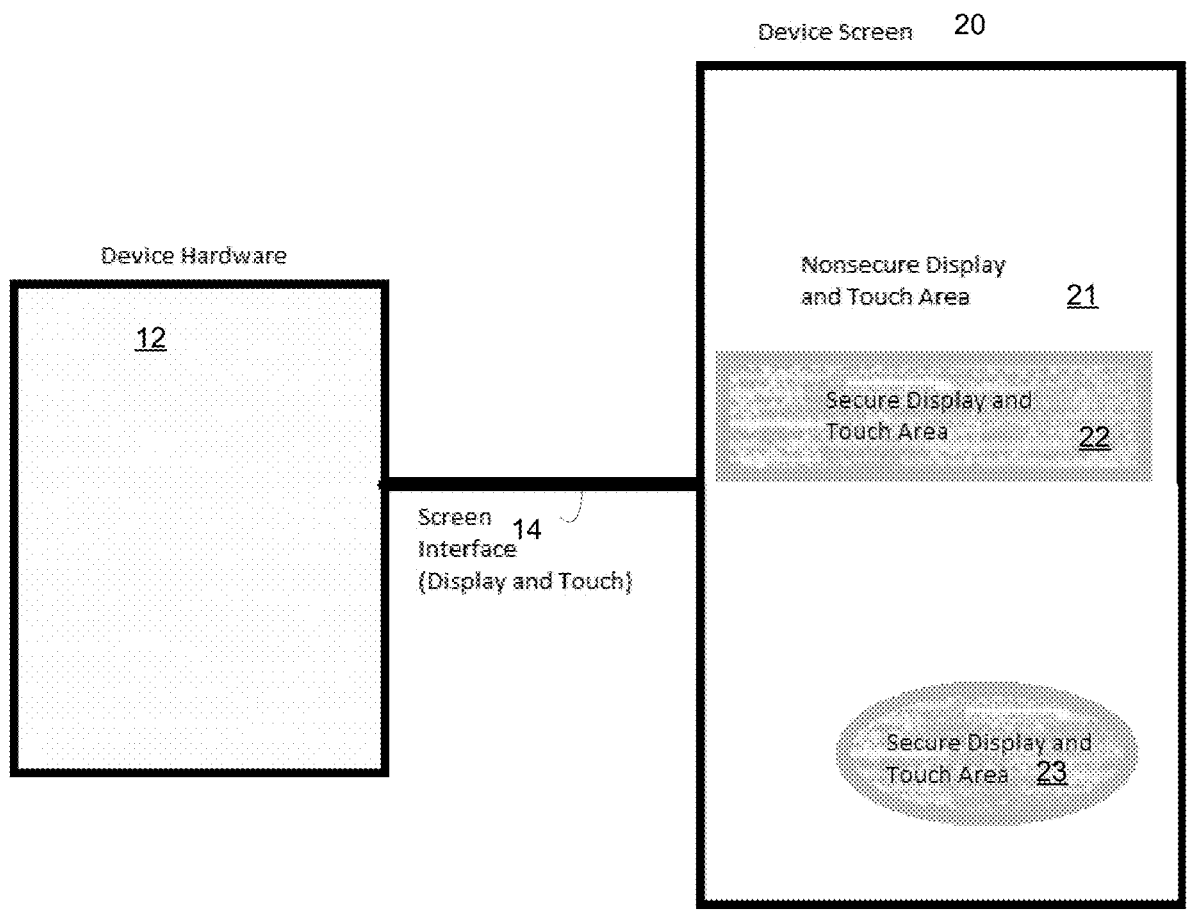
FIG. 1 illustrates an example of a screen and a device hardware.
Figure 2:
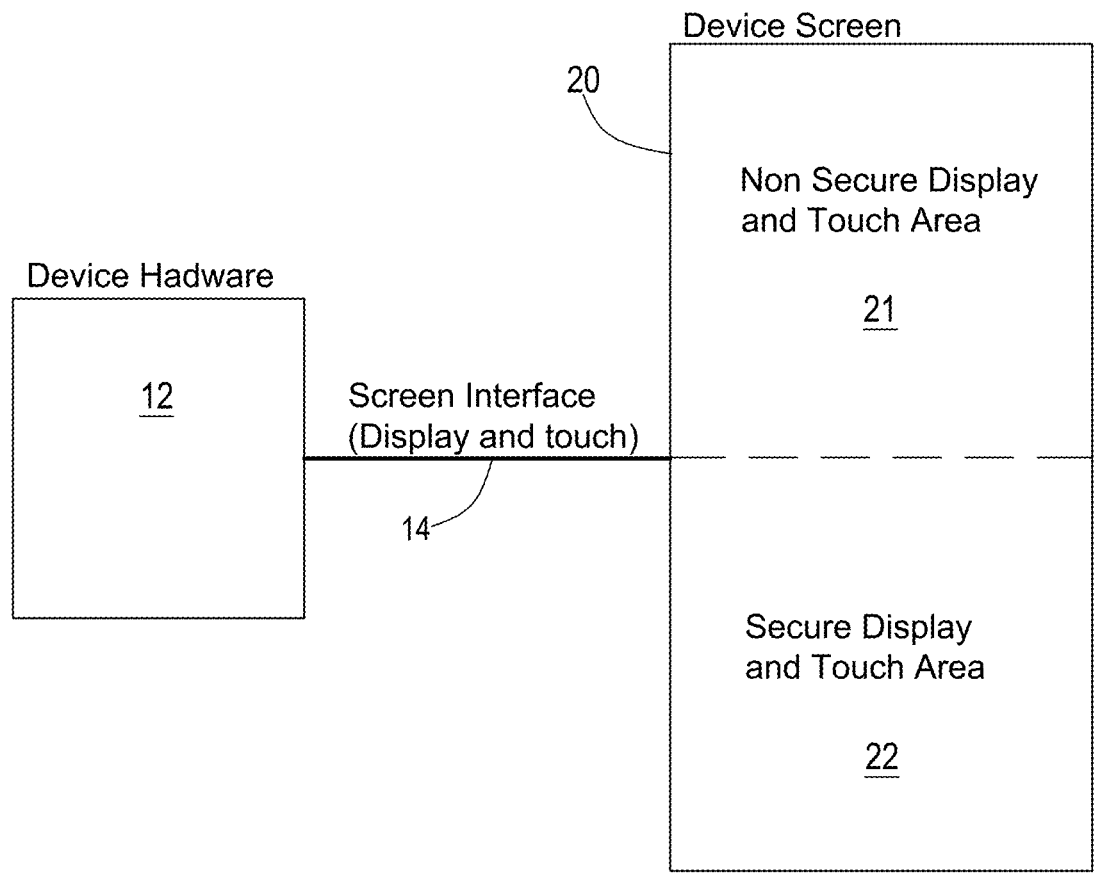
FIG. 2 illustrates an example of a screen and a device hardware.

FIGS. 1 and 2 illustrates a device 10 that includes device hardware 12 (such as a hardware controller) that communicates over a screen interface 14 with device screen 20 and defines a non-secure area 21 and two secure areas 22 and 23.

Each area can be of any arbitrary shape and any number of secure and nonsecure areas can be defined simultaneously on the Device Screen. The layout of the Device Screen is dynamic, and the areas can be changed in size or shape, deleted or added at any time. Display Secure areas are independent of the Touch secure areas.

Device Touch Screen (or only Touch or only Screen) interface is a single COTS module which is not aware of any separation of the information on it. The solution is in addition of the dedicated hardware module between the device input/output to the Touch Screen and the Touch Screen module itself, as illustrated in the following diagram.

The hardware controller separates the data flow for Display and/or Touch interfaces into two distinct groups: secure and nonsecure. The separation happens on the pixel level and based on the physical coordinate of the pixel or a touch point. HUB Module supports any connectivity interfaces for Display and Touch (e.g. LVDS, SPI, I2C, HDMI, VGA, DP). HUB Module supports any number of secure and nonsecure processors and Screen and/or Touch modules.

Figure 3:
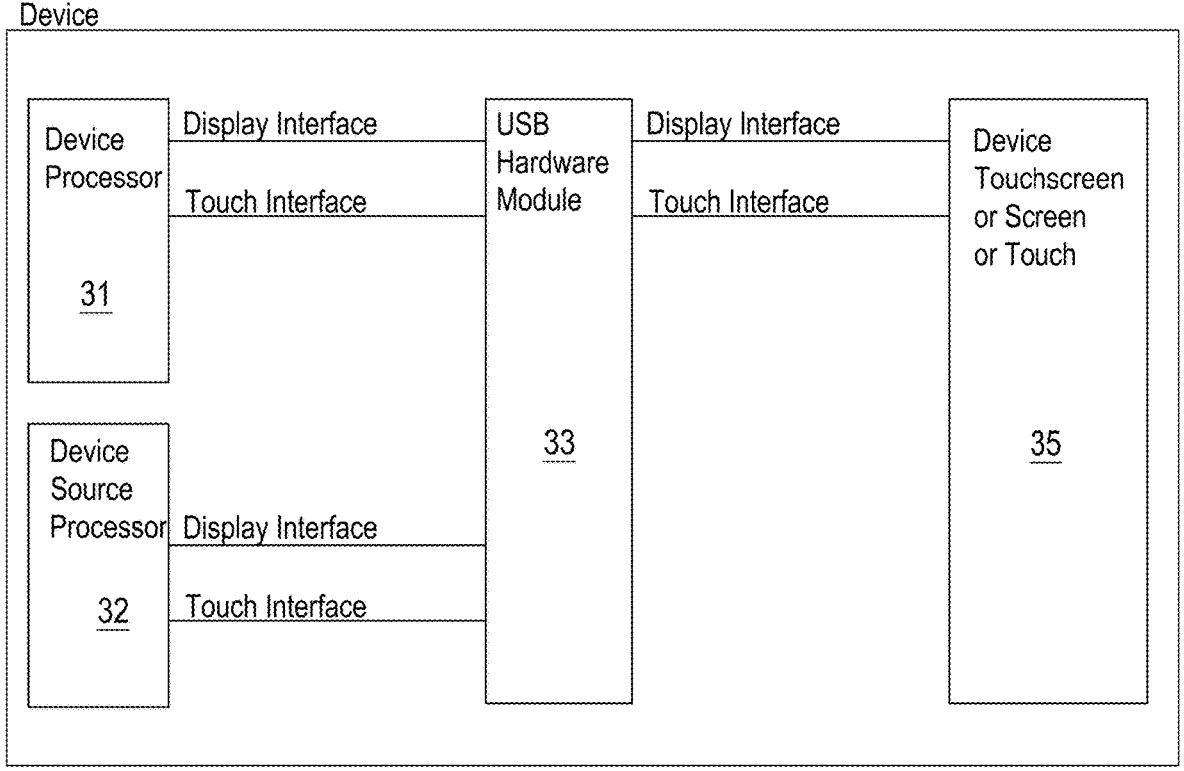
FIG. 3 illustrates an example of a device.

FIG. 3 illustrates a device 10 that includes device processor 31, device secure processor 32, hardware controller 33, and MMI such as a device touch screen 35—and interfaces between the hardware controller 33 and other entities. FIG. 3 illustrates display interfaces (communication towards the MMI) and touch interfaces (communication from the MMI). The touch interfaces may not exist when no communication is sent from the MMI.

Figure 4:
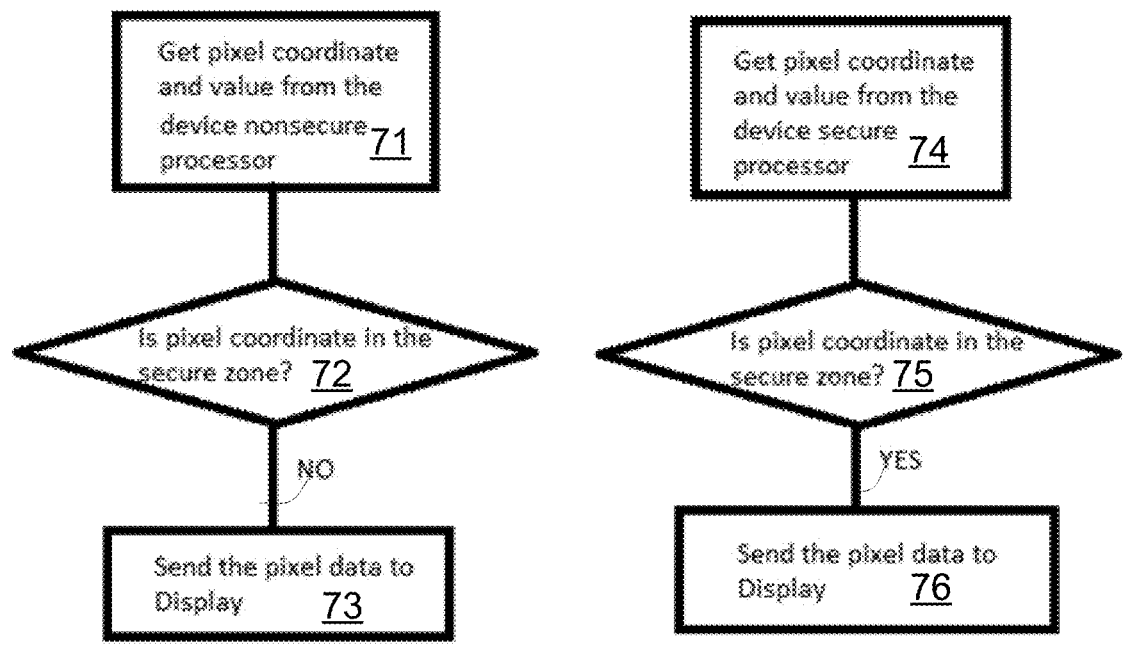
FIG. 4 illustrates an example of a method.

FIG. 4 illustrates an example of a method 70 that may be executed by a display.

Method 70 may include step 71 of getting pixel coordinate and value from a device processor (nonsecure) 71, checking if the pixel coordinate is outside the secure zone (72)—and if so—sending (73) the pixel data to the display.

Method 70 may also include step 74 of getting pixel coordinate and value from a device secure processor 74, checking if the pixel coordinate is in the secure zone (75)—and if so—sending (76) the pixel data to the display. If the coordinates do not match—the pixel data may not be sent to the display.

Figure 5:
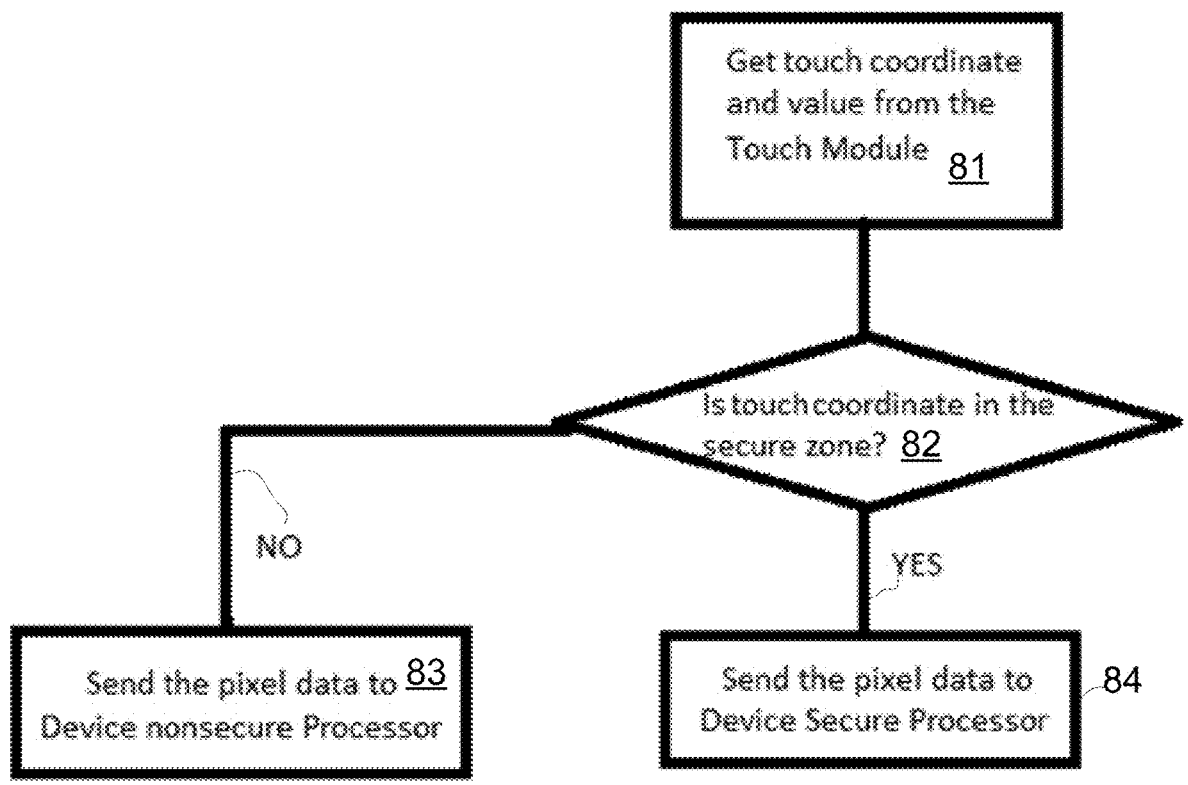
FIG. 5 illustrates an example of a method.

FIG. 5 illustrates an example of a method 80 that may be executed by a sensor (for example—a touch) part of the MMI.

Method 80 may also include step 84 of getting touch coordinate and value from a touch module 81, checking if the pixel coordinate is in the secure zone (82)—and if so—sending (84) the pixel data to the device secure processor—and if not—sending (85) the pixel data to the device processor (not secure).

The hardware controller may be implemented with various programmable ICs

The hardware controller be located at the middle of existing display and touch interfaces, e.g USB, HDMI, LVDS, DP, VGA, I2C, SPI, RGB, LAN, UART, DVI.

Figure 6:
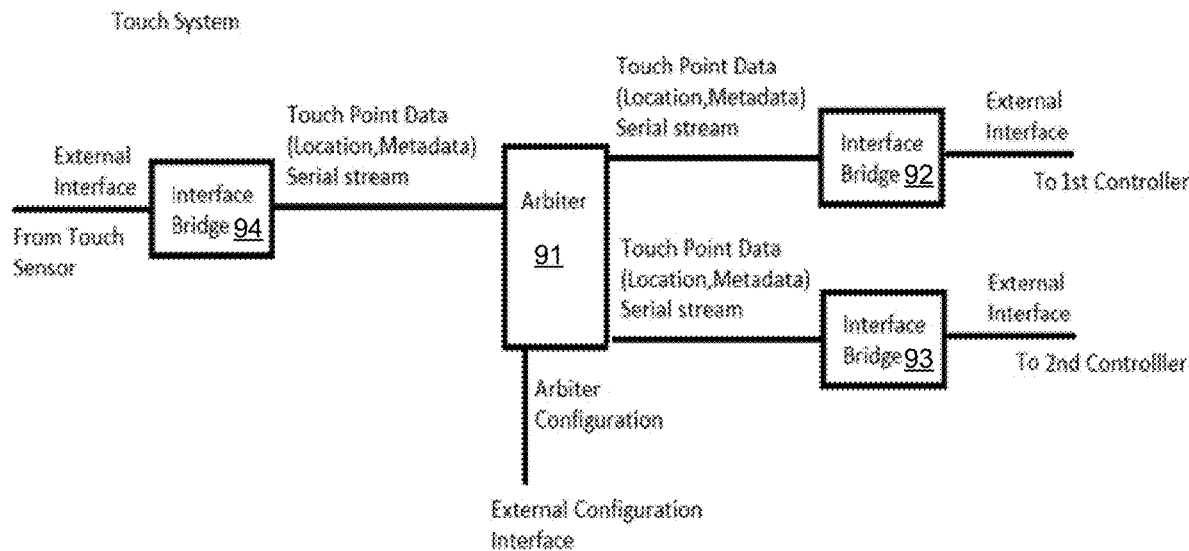
FIG. 6 illustrates an example of a hardware controller.

An example of the hardware controller 90 is illustrated in FIG. 6.

The hardware controller 90 may include an arbiter 91, and interface bridge modules 92, 93 and 94 for interfacing between the hardware controller 90 and the touch sensor, the secure processor (also referred to as "$1^{st}$ Controller") and the nonsecure controller (also referred to as "$2^{nd}$ Controller").

An interface bridge module may be configured to convert proprietary external interface and standard internal pixel serial stream interface. Pixel stream interface is a collection of pixels, where each pixel is defined by its location on the display (e.g. x, y or r, theta) and a metadata (e.g. color value). The central arbiter module is configured by the dedicated interface from the external host. The arbiter configuration may maps each pixel location on the display to a single Controller input (e.g. 1, 2, 3, 4 . . . ). The mapping can be in form of the vector, table text file or other format. The arbiter receives pixel streams from the Controllers and outputs a single pixel stream to the display, where each pixel is chosen between all incoming pixels for the same coordinates and nothing. There is a valid case, where no pixel is received for the specific location. In this case the Arbiter will output to the display a predefined pixel value, as set in the Arbiter configuration.

The internal stream of pixels can be serial, parallel or any other physical collection of data. It can be continuous or in bursts, clock synchronized or asynchronous.

Partitioning of the display or the touch area is defined by an external entity, e.g. FPGA, CPU, ASIC. The partitions can be changed at any time by sending the new configuration to the Arbiter over the configuration interface. The rate of the change for each pixel in the display depends on the internal refresh rate of the display component and is equal or less than this refresh rate. The rate of the change of touchpoint is immediately following the reception of the configuration data by the Arbiter.

Figure 7:
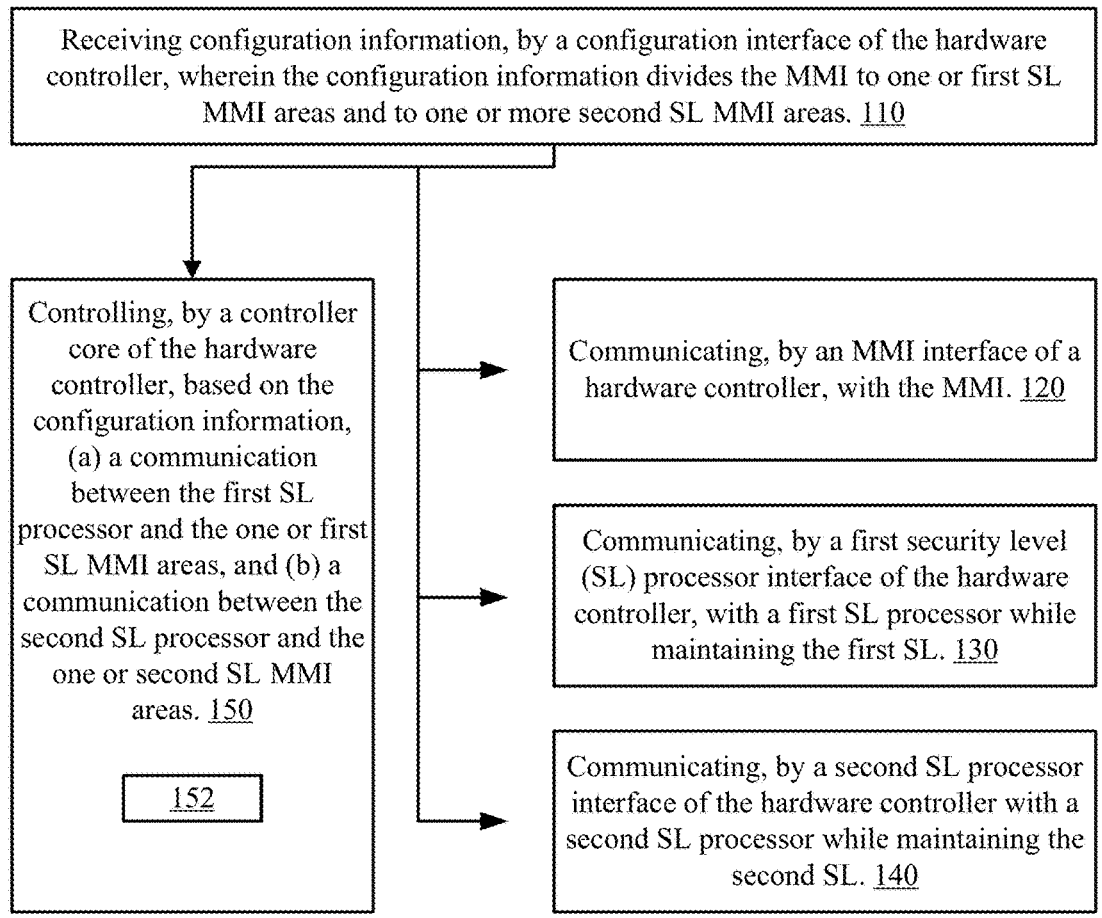
FIG. 7 illustrates an example of a method.

FIG. 7 illustrates method 100 for securing one or more parts of a man machine interface (MMI).

Method 100 may include step 110 of receiving configuration information, by a configuration interface of the hardware controller, wherein the configuration information divides the MMI to one or first SL MMI areas and to one or more second SL MMI areas.

The first SL may be a non-secure SL, and the second SL may be a secure SL. This is illustrated in FIGS. 1-6.

Alternatively—the first SL and the second SL may be secure SLs.

The number of different secure levels may exceed two. May be, for example between 3 and 50, and the like.

Step 110 may be followed by steps 120, 130, 140, and 150.

Step 120 may include communicating, by an MMI interface of a hardware controller, with the MMI.

The MMI may be a screen, and step 120 may include using uni-directional communication.

The MMI may be a screen, and step 120 may include using bi-directional communication.

Step 130 may include communicating, by a first security level (SL) processor interface of the hardware controller, with a first SL processor while maintaining the first SL.

Step 140 may include communicating, by a second SL processor interface of the hardware controller with a second SL processor while maintaining the second SL; wherein the second SL differs from the first SL.

Step 150 may include controlling, by a controller core of the hardware controller, based on the configuration information, (a) a communication between the first SL processor and the one or first SL MMI areas, and (b) a communication between the second SL processor and the one or second SL MMI areas.

The configuration information may be of a pixel resolution.

Step 150 may include step 152 of arbitrating, by an arbiter of a controller core, based on the configuration information, between first pixel value information received by the first SL processor interface and second pixel value information received by the second SL processor interface.

Step 152 may be based on pixel location information associated with each one of the first pixel value information and the second pixel value information.

While the previous steps referred to two SLs—the number of SLs may exceed two—for example may equal three—and in this case the method may include communicating, by a third SL processor interface with a third SL processor; wherein the third SL differs from the second SL; wherein the configuration information further divides the MMI to one or more third SL MMI areas in addition to the one or first SL MMI areas and to the one or more second SL MMI areas.

Step 110 may include receiving, by the configuration interface, different configuration information values over time. Step 150 may be executed based on the different configuration values.

Figure 8:
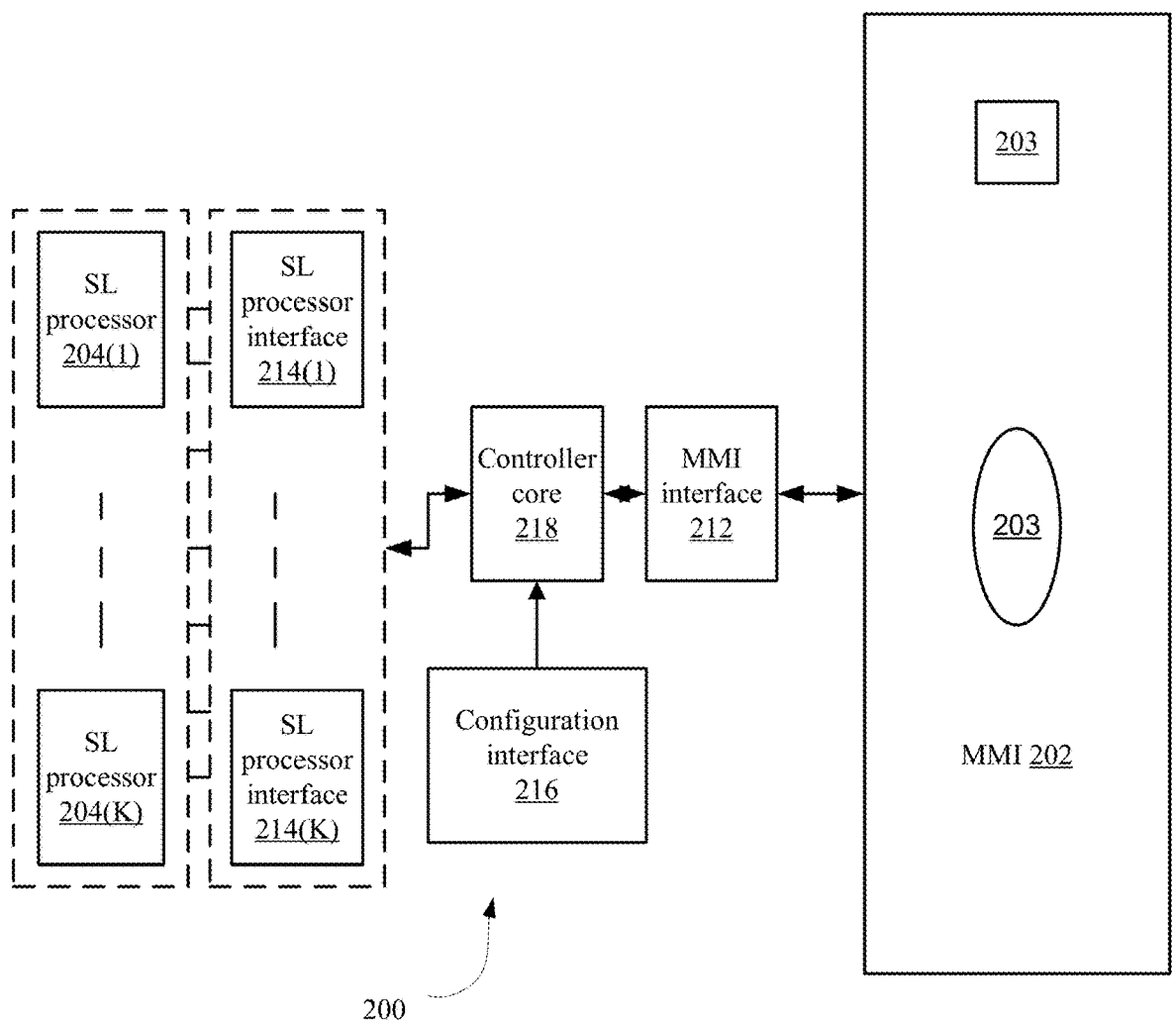
FIG. 8 illustrates an example of a hardware controller.

FIG. 8 is an example of a hardware controller 200 for securing one or more parts of an MMI 202. The hardware controller may include (i) a MMI interface 212 configured to communicate with the MMI 202, (ii) a plurality (K) of SL processor interfaces 214(1)-214(K) configured to communicate with K SL processors 204(1)-204( )K) while maintaining J different SLs, J and K are integers that exceed two, J may equal K or may differ from K, (iii) a configuration interface 216 configured to receive configuration information that divides the MMI to different SL MMI areas 203 of up to J different SLs, and (iv) a controller core 218 configured to control, based on the configuration information, the communications between the different SL MMI areas and the K SL processors.

In FIGS. 1-6 K and K equaled two—but the values of J and K may exceed two.

The phrase "may be X" indicates that condition X may be fulfilled. This phrase also suggests that condition X may not be fulfilled.

The terms "including", "comprising", "having", "consisting" and "consisting essentially of" are used in an interchangeable manner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one example, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit that is illustrated in any of the figures and/or specification and/or the claims may be provided.

Any combination of steps, operations and/or methods illustrated in any of the figures and/or specification and/or the claims may be provided.

We claim:

1. A hardware controller for securing one or more parts of a man machine interface (MMI), the hardware controller comprises:
   a MMI interface that is configured to communicate with the MMI;
   a first security level processor interface that is configured to communicate with a first processor while maintaining the first security level;
   a second security level processor interface that is configured to communicate with a second security level processor while maintaining the second security level; wherein the second security level differs from the first security level;
   a third security level processor interface that is configured to communicate with a third security level processor; wherein the third security level equals the second security level;
   a configuration interface that is configured to receive configuration information that divides the MMI to one or more first security level MMI areas to one or more second security level MMI areas and to one or more third security level MMI areas; and
   a controller core that is configured to control, based on the configuration information, (a) a communication between the first security level processor and the one or more first security level MMI areas, and (b) a communication between the second security level processor and the one or second security level MMI areas;
   wherein the configuration information is of a pixel resolution; wherein the controller core comprises an arbiter that arbitrates, based on the configuration information, between first pixel value information received by the first security level processor interface, second pixel value information received by the second security level processor interface, and third pixel value information received by the third security level processor interface; wherein the configuration interface is configured to dynamically change an MMI area selected out of the one or more first security level MMI areas, the one or more second security level MMI areas or the one or more third security level MMI areas, and to delete the MMI area by notifying the arbiter about the dynamic change of the MMI area.

2. The hardware controller according to claim 1, wherein the first security level is a non-secure security level, and the second security level is a secure security level.

3. The hardware controller according to claim 1, wherein the first security level and the second security level are both secure security levels.

4. The hardware controller according to claim 1 comprising a fourth security level processor interface that is configured to communicate with a fourth security level processor; wherein the fourth security level differs from the second security level; wherein the configuration information further divides the MMI to one or more fourth security level MMI areas in addition to the one or more first security level MMI areas and to the one or more second security level MMI areas.

5. The hardware controller according to claim 1 wherein the configuration interface is configured to receive different configuration information values over time and wherein the controller core is configured to control based on the different configuration values.

6. The hardware controller according to claim 1 wherein the MMI is a screen and wherein the MMI interface is configured to communicate with the MMI using uni-directional communication.

7. The hardware controller according to claim 1 wherein the MMI is a touch screen and wherein the MMI interface is configured to communicate with the MMI using bi-directional communication.

8. A method for securing one or more parts of a man machine interface (MMI), the method comprises:
   receiving configuration information, by a configuration interface of the hardware controller, wherein the configuration information divides the MMI to one or more first security level MMI areas, to one or more second security level MMI areas, to one or more third security level MMI areas;
   communicating, by an MMI interface of a hardware controller, with the MMI;
   communicating, by a first security level processor interface of the hardware controller, with a first security level processor while maintaining the first security level;
   communicating, by a second security level processor interface of the hardware controller with a second security level processor while maintaining the second security level; wherein the second security level differs from the first security level;
   communicating, by a third security level processor interface of the hardware controller with a third security level processor while maintaining the third security level; wherein the third security level equals the first security level;
   and
   controlling, by a controller core of the hardware controller, based on the configuration information, (a) a communication between the first security level processor and the one or more first security level MMI areas, (b) a communication between the second security level processor and the one or second security level MMI areas, and (c) a communication between the third security level processor and the one or third security level MMI areas;
   wherein the configuration information is of a pixel resolution;

wherein the controller core comprises an arbiter that arbitrates, based on the configuration information, between first pixel value information received by the first security level processor interface, second pixel value information received by the second security level processor interface, and third pixel value information received by the third security level processor interface;

wherein the configuration interface is configured to dynamically change an MMI area selected out of the one or more first security level MMI areas, the one or more second security level MMI areas or the one or more third security level MMI areas, and to delete the MMI area by notifying the arbiter about the dynamic change of the MMI area.

9. The method according to claim 8, wherein the first security level is a non-secure security level, and the second security level is a secure security level.

10. The method according to claim 8, wherein the first security level and the second security level are both secure security levels.

11. The method according to claim 8 comprising receiving, by the configuration interface, different configuration information values over time; and wherein the controlling is executed based on the different configuration values.

12. The method according to claim 8 wherein the MMI is a screen and wherein the communicating, by the MMI interface, comprises using uni-directional communication.

13. The method according to claim 8 wherein the MMI is a touch screen the communicating, by the MMI interface, comprises using bi-directional communication.

14. A non-transitory computer readable medium for securing one or more parts of a man machine interface (MMI), the non-transitory computer readable medium stores instructions for:

receiving configuration information, by a configuration interface of the hardware controller, wherein the configuration information divides the MMI to one or more first SL MMI areas and to one or more second SL MMI areas;

communicating, by an MMI interface of a hardware controller, with the MMI;

communicating, by a first security level (SL) processor interface of the hardware controller, with a first SL processor while maintaining the first SL;

communicating, by a second SL processor interface of the hardware controller with a second SL processor while maintaining the second SL; wherein the second SL differs from the first SL; and controlling, by a controller core of the hardware controller, based on the configuration information, (a) a communication between the first SL processor and the one or more first SL MMI areas, and (b) a communication between the second SL processor and the one or second SL MMI areas;

wherein the configuration information is of a pixel resolution; wherein the controller core comprises an arbiter that arbitrates, based on the configuration information, between first pixel value information received by the first SL processor interface, second pixel value information received by the second SL processor interface, and third pixel value information received by the third SL processor interface; wherein the configuration interface is configured to dynamically change an MMI area selected out of the one or more first security level MMI areas, the one or more second security level MMI areas or the one or more third security level MMI areas, and to delete the MMI area by notifying the arbiter about the dynamic change of the MMI area.

* * * * *